United States Patent [19]

Bierleutgeb

[11] Patent Number: 4,803,352

[45] Date of Patent: Feb. 7, 1989

[54] AUTOFOCUSING SYSTEM FOR A MICROSCOPE AND METHOD OF USING THE SAME

[76] Inventor: Fritz Bierleutgeb, Rottstrasse 16/19, A-1140 Wien, Austria

[21] Appl. No.: 50,267

[22] Filed: May 14, 1987

[30] Foreign Application Priority Data

May 16, 1986 [DE] Fed. Rep. of Germany ....... 3616544
Mar. 9, 1987 [DE] Fed. Rep. of Germany ....... 3707487

[51] Int. Cl.$^4$ .................................................. G01J 1/20
[52] U.S. Cl. ...................................... 250/201; 350/519
[58] Field of Search .......... 250/201 AF, 204, 201 PF, 250/201 R; 354/406, 407, 408; 356/1, 4; 350/507, 518, 519, 522, 521

[56] References Cited

U.S. PATENT DOCUMENTS

| | | | |
|---|---|---|---|
| 4,595,829 | 6/1986 | Neümann et al. | 250/201 |
| 4,620,089 | 10/1986 | Schlichting et al. | 250/201 |
| 4,639,587 | 1/1987 | Chadwick et al. | 250/201 |
| 4,687,913 | 8/1987 | Chabin | 250/201 |
| 4,694,151 | 9/1987 | Yoshimura | 250/201 |

Primary Examiner—David C. Nelms
Assistant Examiner—Jess Ruoff
Attorney, Agent, or Firm—Alan H. Spencer

[57] ABSTRACT

A microscope with continuously or discontinuously variable objective magnification is provided with an autofocus system, the beam path of which passes through the objective and is directed out of the imaging beam path of the microscope between objective and eyepiece to at least one photo-electric detector means. At least one optical system is located or locatable in the beam path of the autofocus system which allows or causes the at least one image formed on the detector means to be altered in scale when a change in the objective magnification occurs. The at least one optical system may be a zoom system or a series of lenses or fixed lens systems arranged to be moved into the beam path of the focusing system. By a coupling mechanism, it is achieved that, upon an exchange of the objective or a change in the objective magnification, the focal length of the at least one optical system located or locatable in the beam path of the autofocus system is varied accordingly.

20 Claims, 3 Drawing Sheets

AUTOFOCUSING SYSTEM FOR A MICROSCOPE AND METHOD OF USING THE SAME

The invention relates to a method for autofocusing a microscope with continuously or discontinuously variable objective magnification according to the preamble of claim 1. The invention relates furthermore to a microscope with continuously or discontinuously variable objective magnification according to the preamble of claim 17.

In microscope examinations it is often required to be able to quickly change between different magnifications, whereby objectives are used, the magnifying powers of which vary over a wide range, for example, from 5× to 150× and beyond. As such microscopes are used on a large scale for microscope inspections, i.e. for routine examinations, in the production of, for example, wafers and visually focusing is extremely tiresome for the microscope operator, increasing efforts have been made to employ autofocus systems which permit to quickly focus automatically, and in some instance also more exactly than is visually possible, on the object. It was, however, found that conventional autofocus systems, in particular when used with a radiation which excludes damage or change of the semi-conductor wafer viewed are not satisfactory in performance when the objective magnification varies over a wide range by an order as is, for example, indicated above. This is, for one, due to the fact that with increasing magnification the structures contained in the object or generated on the object are blurred with respect to edge contrast which results in an increasing inaccuracy when this contrast or values derived therefrom, such as the content of high spatial frequencies, are relied upon for focusing. It was found by the applicant that a further problem resides in the fact that the depth of focus on the image side increases as the magnification increases, and that by the square of the magnification of the objective, which is apt to contribute to a considerable extent to the, in some instances inexplicable, failure of conventional autofocus systems at different magnification. It is therefore the object of the present invention to provide an autofocus system, i.e. a method of autofocusing, and a microscope with autofocus system, by which safe and optimal automatic focusing on the object is accomplishable even with highly differing microscope magnifications.

According to the present invention, this object is established by a method as described in claim 1. The term "signals" used in the present context embraces both optical and electric signals. In the autofocus system of the present invention, there are first optical signals generated which are subsequently converted into electric signals by electro-optic transducers, which electric signals can be further processed electronically and, after having been further processed, yield at least one control signal which is capable of causing a shifting movement of object and/or objective in the direction of optimum focus in a manner known per se, for example, via appropriate electric motors and drives.

In a particularly preferred embodiment of the present invention, optical means are provided to compensate for variations in the signals caused by a change in the objective magnification, which optical means adjust the optical signals prior to their conversion into electric signals. As an alternative or in addition to this, electronic means may be employed for compensating for the variations in the signals caused by a change in the objective magnification, which electronic means influence or process the electric signals, such as gradation amplifications or shifts in frequency behaviour of electric filters, integrator circuits etc. In practice, it was, however, found that the optical means are satisfactory in performance. In a particularly preferred embodiment of the method of the present invention, the optical signals are in the form of two separate images formed of the object upon separate electro-optic transducers or upon separate portions of one electro-optic transducer,- the focal planes generated as a result of back projections from said transducers or said portions of said one transducer which receive said images being separated from each other and lying above and below, respectively, the plane of focus for the object. The particular advantage of this method resides in the fact that it is equally suitable for use in incident and transmitted light microscopy. It is advantageous for the optical means to be lenses or lens systems which effect a scale alteration of the image generated by the objective in the course of the formation of the optical signals and, in particular, scale down said image so as to cause the step contrasts to increase and the image-side depth of focus to decrease. In a variant of the method of the present invention, the scale alteration is effected in a step-wise manner in that, for example, an appropriate lens or lens system is inserted into the focusing beam path corresponding to the objective used in each case. Said lenses or lens systems may be arranged, for example, on a turret.

According to the preferred practice of the invention, the scale alteration is, however, effected continuously by means of a zoom lens system arranged in the beam path of the focusing system. As a result, the objective magnification can be compensated for at least to such an extent that the disadvantageous influence caused by increasing image-side depth of focus can be eliminated and the flattening of the edge contrast occurring as a result of high magnifications is reduced to such an extent that, when the reference signals used for focusing are compared, a reliable distinctive criterion is obtainable.

It is appropriate for the scale alteration to be effected in conjunction with the change in the objective magnification and automatically. Manual adjustment is, however, also possible, which might become necessary in case of weak image contrasts in order to sample out a contrast portion acceptable for the autofocus system. In the practice of the method of the invention, it was found particularly useful for the scale alteration to be effected after the optical signals have been deflected out of the imaging beam path of the microscope, so as to not affect the latter. It was found to be particularly appropriate for the optical means used for scale alteration to be effective prior to the splitting into two separate signals. It was furthermore found particularly suitable for the optical signals to be balanced as to image size and brightness prior to the formation of the separate images, at least when the system is in a position of optimum focus, i.e. when the system is in a position of optimum focus, the images formed are of equal size and brightness, which is normally not necessarily the case due to the different scale ratios and different numbers of reflections or glass surfaces to be passed. These measures can easily be implemented by using simple positive and negative lens systems, respectively, and respective neutral grey filters arranged in one of the beam paths.

In particular after both signals used for focusing having been balanced in such a way, is it possible to rely upon the brightness of both images for coarse focusing, a criterion which is also effective, for example, when the back projections of both images into the object area do not include the actual focusing range.

At least for fine focusing use is made of the signal contents corresponding to a range of high spatial frequencies which can be extracted optically by appropriate gratings or electrically by appropriate filters. At least one TV pick-up means is preferably used as electro-optic transducer, the separate images being advantageously represented adjacent each other on at least one TV screen. This allows visual supervision of the focusing operation and, moreover, verification whether a portion of the object is chosen which is suitable for autofocusing purposes, i.e. a high-contrast portion of the object, as a result of which the shifting of the object or a scale alteration in the autofocus system appears advisable.

According to a further practice of the method of the present invention, partial images of the object are imaged on a detector means adjacent or overlapping each other, the evaluation electronics causing focusing on the basis of the most suitable spatial frequency range obtainable from the partial images.

The microscope of the present invention with continuously or discontinuously variable objective magnification and an autofocus system, the beam path which passes through the objective and is directed out of the imaging beam of the microscope between objective and eyepiece to at least one photoelectric detector means is distinguished by at least one optical system inserted or insertable in the beam path of the autofocus system, which optical system allows or causes a scale alteration of the at least one image formed on the detector means when there is a change in objective magnification, which entails the advantages explained above with reference to the method of the present invention, namely that safe and exact automatic focusing is accomplishable even with highly differing objective magnifications. The optical system causing the scale alteration preferably comprises a zoom system which, on principle, may, however, also be substituted by a series of lenses or lens systems independently insertable into the beam path, which lenses or lens systems may be arranged on a turret. Appropriately, a coupling mechanism is provided which, upon an exchange of the objective or a change in the objective magnification causes the focal length of the at least one optical system located or locatable in the beam path of the autofocus system to be varied accordingly.

Re-adjustment operations which might become necessary, in particular in case of poor contrasts, are particularly easy to accomplish when the coupling mechanism causes an appropriate basic setting of the focal length of the at least one optical system for each given objective magnification and, besides that, permits manual manipulation for adjusting the focal length.

According to a constructionally particularly simple embodiment of a microscope with incident and/or transmitted illumination and two detector means arranged such that their back projections via the optical trains of the autofocus system and the objective lie in separate focal planes in the vicinity of the plane of focus for the object, the optical system for scaling the images formed of the object on the detector means is located or locatable in an area along the focusing beam path, through which area the beams leading to the two detector means jointly pass. In an alternative embodiment of this microscope, one optical system for scaling the images formed of the object on the detector means is located or locatable in each of the beam portions leading separately to the respective detector means. The two optical systems associated with the detector means may be differently designed, preferably in such a manner that they simultaneously ensure balance as regards brightness and/or size when the system is in focus. According to a particularly preferred embodiment of the invention, a beam splitter is positioned in the imaging beam path of the microscope in such a manner that an intermediate image is formed of the object by the focusing beam deflected by said beam splitter, which intermediate image is scaled by the at least one optical system and imaged, either directly or via a further intermediate image, upon the detector means. It is advantageous to position a collimator in front of said optical system in such a manner that it images the pupil of the microscope objective into the pupil of the related optical system. Preferably, at least one TV camera is used as detector means on which two contiguous, preferably adjacent, equally sized images of the object are formed which are both equally bright and equally blurred when the system is in focus. There are electronic signal processing means connected to the TV camera for controlling the shifting movement of the object stage and/or the microscope objective until optimum focus is reached. A viewing screen may be provided for visual inspection.

If only one single TV camera is used which receives both images, an electronic circuit with a difference amplifier is connected, a switch being provided which, after each scanning interval of the TV camera which is equal to the width of one of the images formed on the camera applies the, if appropriate processed, signal from the camera to the respective other input of the difference amplifier.

The electronic circuit is moreover so laid out that variations in the signals which are to be attributed to the object and objective being moved relative to each other during focusing do not result in false measuring results.

In the following, the present invention will be explained in more detail with reference to the accompanying drawings:

FIG. 1 schematically shows the beam path of the microscope with autofocus system according to the present invention.

Figure 1:
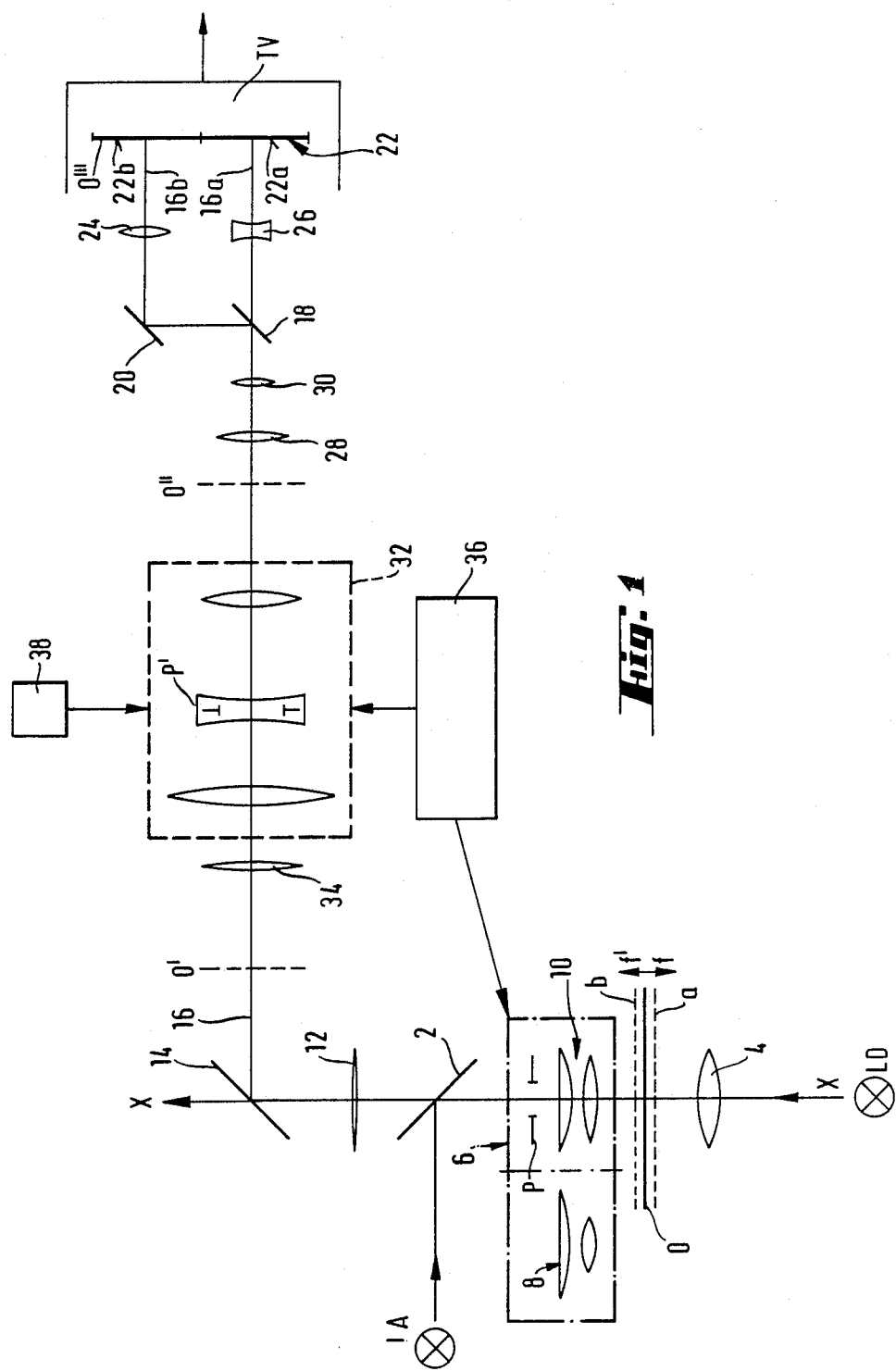

FIG. 1 schematically shows the most important portions of the beam path of a microscope and of the autofocus system thereof. The optical axis of the microscope is designated by letters X—X. The letter O designates an object plane which is adjustable—as is indicated by arrows f—f'—along the optical axis X—X of the microscope. The microscope is designed for incident light and transmitted light microscopy. In the case of incident light illumination, light emergent from a light source LA is directed onto a semi-transparent mirror 2 which deflects the light into the beam path X—X. In the case of transmitted light illumination, light emergent from a light source LD is likewise directed on object plane O after having passed through a condenser 4. A series of objectives having different magnifying powers are held in a lens turret 6, which has only been schematically represented, such that when turret 6 is rotated, the individual objectives can be inserted successively into the beam path X—X. For better plainness, only two objectives are shown of which objective 10 is arranged in the beam path and objective 8 is not. Focusing is effected by shifting the object plane O in the direction of arrows f and f', respectively. The pupil of the objective 10 is designated by letter P. A tube lens 12 is located in the beam path extending from objective 10 to a not shown eyepiece or binocular tube. Located after said tube lens 12 is a semi-transparent mirror 14 deflecting a focusing beam out of the beam path X-X, the optical axis of said focusing beam being designated by numeral 16. Said focusing beam leads to a TV camera indicated as TV. The final portion of the beam path 16 in front of the TV camera is divided into two beam portions 16a and 16b by a splitter mirror, beam portion 16b being deflected by a reflecting mirror 20 in such a way that it extends parallel to beam portion 16a. Both beam portions 16a and 16b are incident on a light-sensitive film 22 of the TV camera, the pick-up lens of which has been removed. Beam portions 16a and 16b form two images 22a and 22b of an object located in the object plane O upon the light-sensitive film 22 as image plane O'''. The arrangement is such that images 22a and 22b are adjacent each other as narrow as possible, but do not overlap. As a result of a back projection from the surface area of light-sensitive film 22 related to image 22a into the object area, a focal plane a is obtained, and a focal plane b is obtained as a result of a back projection from the surface area of the light-sensitive film 22 related to image 22b. When the object plane O is in the focal plane a, the image formed of the object on the light-sensitive area 22a of the light-sensitive film 22 will be sharp, while the image on area 22b of the light-sensitive film 22 will be blurred, and vice versa. In FIG. 1, the object plane O is located centrically between planes a and b, so that both images 22a and 22b are equally blurred, a lens 24 located in beam portion 16b causing partial images 22a and 22b to be of equal size. Furthermore, a netural gray filter 26 may be arranged in beam portion 16a by which measure it is made allowance for the fact that more light is absorbed along beam path portion 16b than along beam path portion 16a, so that partial images 22a and 22b are likewise balanced with respect to brightness. As is apparent from FIG. 1, imaging of the object by focusing beam 16 is not effected directly onto areas 22a and 22b, respectively, of the light-sensitive film 22, but via intermediate images, in the present case two intermediate images O' and O''. Intermediate image O' is generated by objective 10 and tube lens 12, the size and scale, respectively, of the image formed of the object at the intermediate image plane O' being dependent on the magnification of objective 10. The location of intermediate image O', however, remains unchanged. If the lenses 28 and 30, positioned in front of beam splitter 18, were chosen such that they imaged an image of the object formed in intermediate image plane O' onto light-sensitive film 22, the object details in the images formed on the light-sensitive areas 22a and 22b would be represented at varying size, depending on the magnification of the objective chosen in each case. As already mentioned at the outset, such an image enlargement, however, causes a flattening of edge contrasts, i.e. a reduction in high spatial frequencies, which, for example, might be relied upon in a subsequent electronic control circuit as focusing criterion. On the other hand, ss has likewise already mentioned before, the image-side depth of focus, i.e. the depth of focus in the area of the light-sensitive film 22, increases as the objective magnification increases, so that, for this reason too, focusing is rendered more and more difficult. To counteract this, the intermediate image O' is imaged into a stationary second intermediate image plane O'' by means of a zoom system 32 as well as—in the depicted embodiment—a collimator 34. The collimator 34 causes parallel light to be guided to zoom system 32 and, furthermore, images pupil P of objective 10 into pupil P' of zoom system 32. In intermediate image plane O'' there is thus formed a reduced image of the image of object O generated in the intermediate image plane O' which has been rendered in enlarged size by objective 10. By an appropriate reduction in size, it is possible to form an image of the object O in the intermediate image plane O'' which does not, or only little, vary in size, irrespective of the magnification of the objective in use. This may be accomplished by means of a coupling mechanism 36, which, when lens turret 6 is moved, automatically adjusts the focal length of zoom system 32 and thus its enlarging and reduction effect, respectively, to corresponding basic settings, a manually operable actuator 38 being provided as well which allows intentionally different or additional adjustments of the focal length of the zoom system 32, which might be desirable, for instance, in case of particularly weak object contrast.

Examples of such basic settings are given in the following table:

| Magnification of microscope objective | Focal length of zoom system |
| --- | --- |
| 5×/10× | 80 mm |
| 20× | 60 mm |
| 50× | 30 mm |
| 100×/150× | 18 mm |

The collimator then has, for example, a focal length of 70 mm, lens 28 a focal length of 40 mm and lens 30 a focal length of 25 mm when two adjacent identical images are to be formed on a TV camera of ⅔".

Figure 2:
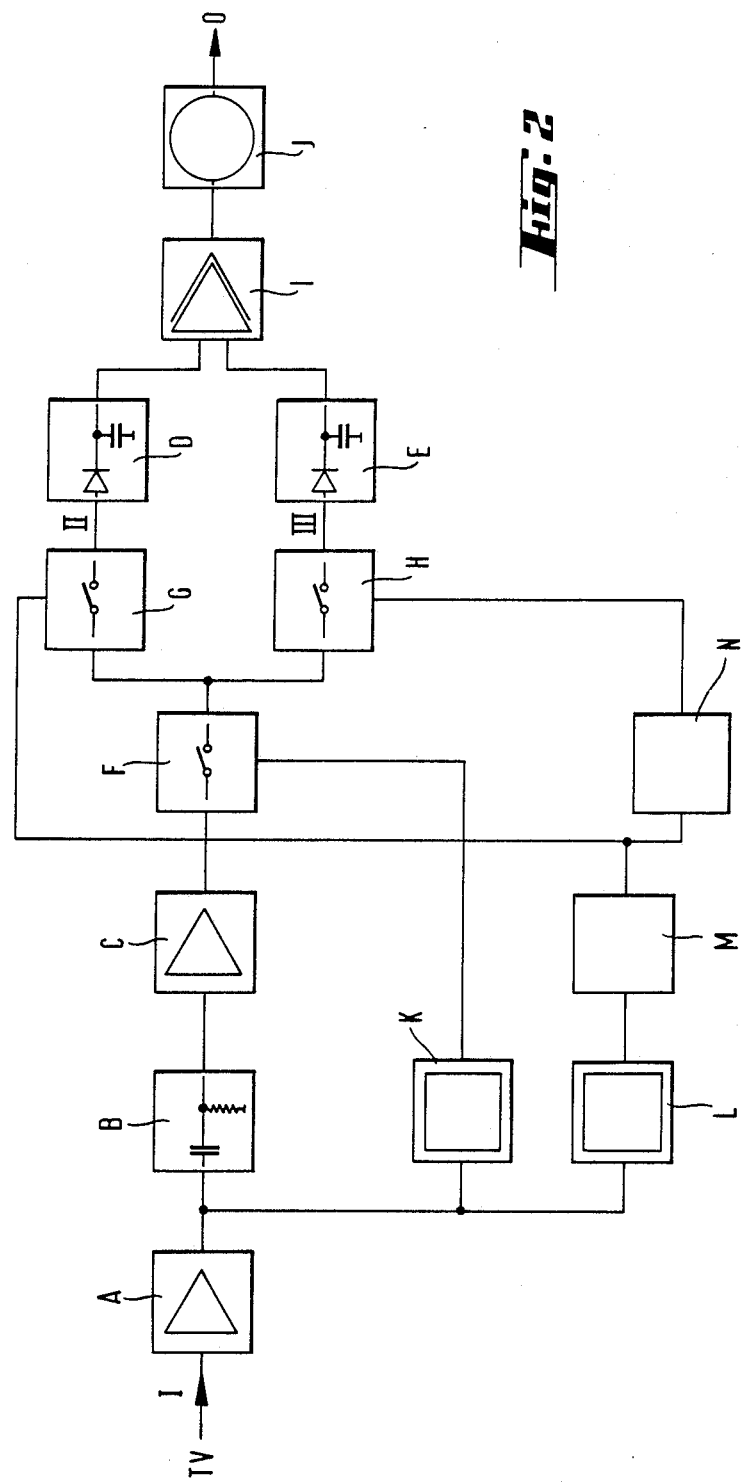
FIG. 2 shows an electronic circuit to be connected to the TV camera shown in FIG. 1.
Figure 3:
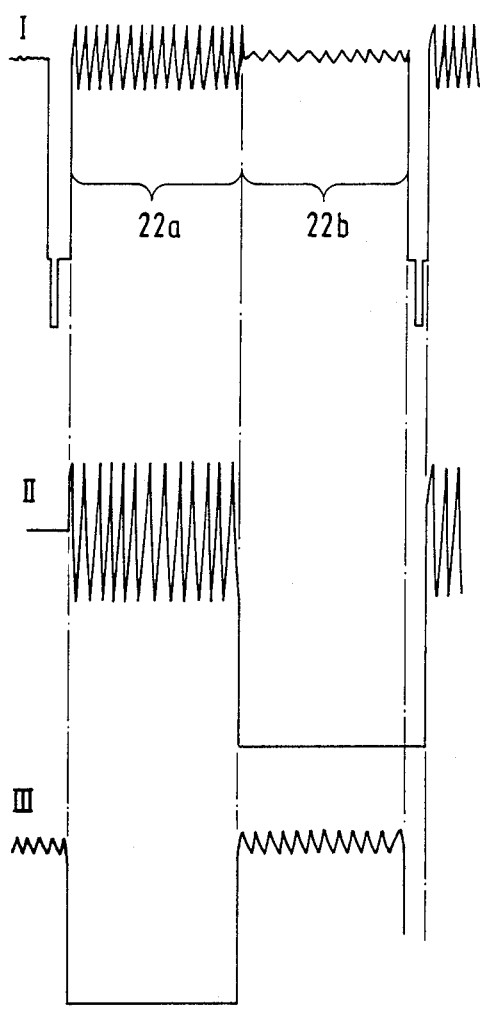
FIG. 3 shows signal plots derived from the circuit of FIG. 2.
Figure 3:
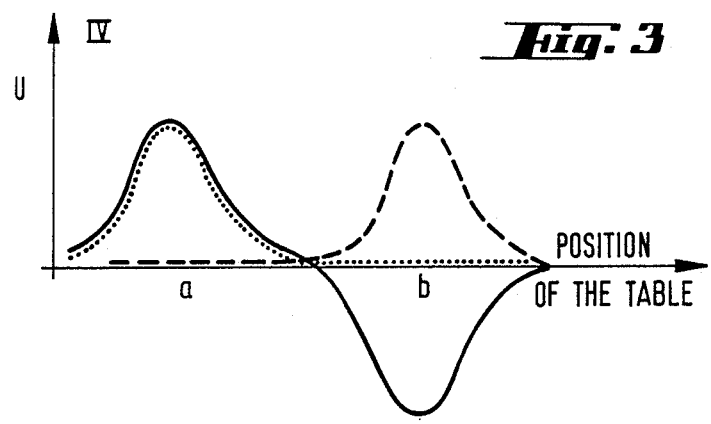

Connected to the TV camera is, for example, the electronic circuit shown in FIG. 2. The output signal of the TV camera is applied to an input amlifier A and has the shape shown in plot I of FIG. 3, provided that the object plane is nearer to one of the two focal planes a, b. If it is assumed that the object plane is nearer to the focal plane a, the image formed on the light-sensitive area 22a is sharper than the image formed on the light-sensitive area 22b, so that the electric signal shown in plot I is derived from the scanning beam of the TV camera guided over the entire width of the light-sensitive film 22, in which electric signal the content of harmonics is very high as long as the scanning beam scans the light-sensitive area 22a and very low when it scans the light-sensitive area 22b. Such a scanning line is delimitated on either side by horizontal synchronization signals which are likewise represented in plot I of FIG. 3.

A high-pass filter B is connected to input amplifier A and allows preferably high-frequency vibrations to pass. Connected to said high-pass filter is a post-amplifier C. Two electronic switches G and H are connected in parallel to the electronic switch F, to which switches G and H two demodulators D and E are connected in series, one of which is connected to the positive input and the other to the negative input of a power difference amplifier I, the output of which controls a servoelement J for adjusting the object plane O. Between input amplifier A and high-pass filter B, a branch line is provided which leads to a unit K for recognizing the vertical synchronization. The output of unit K is applied to and controls electronic switch F. This unit K opens switch F as long as vertical synchronization pulses arrive and closes switch F the rest of the time during which the entire width of light-sensitive surface 22 is scanned over both areas 22a and 22b line by line until its surface has been completely scanned, so that an activation of servo-motor J is excluded during the arrival of the vertical synchronization pulses.

Between input amplifier A and high-pass filter B, there is furthermore provided a unit L for recognizing horizontal synchronization, the output of which is applied to a single shot M whose output in turn is applied to electronic switch E and via a further single shot N to electronic switch H. Single shot M is activated by unit L each time a horizontal synchronization pulse arrives. Single shot M then closes electronic switch G over half the length of one scanning line, i.e. as long as the scanning beam scans area 22a of the light-sensitive film 22, while electronic switch H is open and triggers single shot N after the predetermined time has elapsed, at the same time, the electronic switch B being opened. When single shot N is activated, it closes electronic switch H over the predetermined period of time, namely the time required for the second half of the scanning line to be scanned covering the width of area 22b of the light-sensitive film 22. The electric signals applied to demodulators D and E therefore look as shown in plots II and III of FIG. 3.

The demodulators D and E output a d.c. voltage signal, the value of which is the higher the higher the content of harmonics in the electric signals applied to demodulators D and E is. This means that in the present example the output signal from demodulator D is very high, whereas the output signal from demodulator E is very low. The d.c. voltages from demodulators D and E practically do not change within one image line.

In plot IV of FIG. 3, the d.c. voltage from demodulator D is represented in dotted outline and and the d.c. voltage from demodulator E in dashed outline as a function of the position assumed by object plane O, the focal planes a and b having been indicated as well. If, for example, object plane O lies in focal plane a, the d.c. voltage from demodulator reaches its maximum, while the d.c. voltage from demodulator E reaches its minimum, which is practically zero. The opposite is true when the object plane lies in focal plane b. The power difference amplifier I now forms the difference signal between the voltage indicated in dotted outline and the voltage indicated in dashed outline. Here, it must be remembered that one voltage is applied to the positive input and the other voltage to the negative input, which results in a reversal of polarity at the output of the power amplifier. This output voltage is indicated by the continuous line. With this voltage, it is easy to activate the d.c. motor J acting as servo-motor which moves the object plane O. The servo-motor J will locate the position where the voltage line indicated in continuous outline intersects the absciss, which is exactly in the middle between focal plane a and b. The control loop is closed.

I claim:

1. A method of autofocusing a microscope having an objective and a plurality of magnifications of an object, which comprises separating a portion of the image-producing light received through the objective from the object, generating two signals from said portion, each of said signals varying inversely to the other signal, modifying said signals when the magnification is changed and controlling the microscope focus with said modified signals.

2. The method according to claim 1, wherein said signals are modified by a zoom lens system.

3. The method according to claim 1, wherein said signals are modified electronically.

4. The method according to claim 1, wherein said signals are further modified to balance for differences in image size and brightness.

5. An autofocusing system for a variable power microscope having an imaging system, including an objective, for providing a magnified image from light received from an object, a focusing mechanism and means to direct a portion of the image-producing light from the objective to said autofocusing system, which comprises a beam divider to direct said portion along two paths, imaging optics located on each path, electro-optical means to convert light from said imaging optics into two electrical signals, each of said signals having one characteristic varying inversely to the one characteristic of the other as the microscope focus changes, means to modify said signals when the magnification is changed, and control means to drive the focusing mechanism in response to said signal, whereby deleterious effects of changes in magnification are reduced.

6. The system according to claim 5, wherein said modifying means includes optics to vary the size of the image on said electro-optical means in response to changes in magnification.

7. The system according to claim 6, wherein said optics include a zoom system.

8. The system according to claim 6, wherein the size of the image is maintained substantially constant as the magnification is varied.

9. The system according to claim 7, wherein the size of the image is maintained substantially constant as the magnification is varied.

10. The system according to claim 7, further including balancing means for equalizing other characteristics of one of said signals that differ from the corresponding other characteristics of the other of said signals.

11. The system according to claim 5, wherein said one characteristic represents spatial frequency.

12. The system according to claim 10, wherein said one characteristic represents spatial frequency.

13. The system according to claim 12, wherein said other characteristics include representations of brightness and image size.

14. The system according to claim 5, wherein a second characteristic of each of said signals is used for course focusing and said one characteristic is used for fine focusing.

15. The system according to claim 14, wherein said second characteristic is brightness.

16. The system according to claim 7, wherein a second characteristic of each of said signals is used for course focusing and said one characteristic is used for fine focusing.

17. The system according to claim 16, wherein said second characteristic is brightness.

18. The system according to claim 12, wherein a second characteristic of each of said signals is used for course focusing and said one characteristic is used for fine focusing.

19. The system according to claim 18, wherein said second characteristic is brightness.

20. The system according to claim 19, wherein said other characteristics include a representation of image size.

* * * * *